(12) United States Patent
Low

(10) Patent No.: US 9,331,918 B2
(45) Date of Patent: *May 3, 2016

(54) LINK USAGE

(71) Applicant: Hitwise Pty. Ltd., Melbourne, Victoria (AU)

(72) Inventor: Sydney Gordon Low, Victoria (AU)

(73) Assignee: Connexity, Inc., Los Angeles, CA (US)

( * ) Notice: Subject to any disclaimer, the term of this patent is extended or adjusted under 35 U.S.C. 154(b) by 226 days.

This patent is subject to a terminal disclaimer.

(21) Appl. No.: 14/034,965

(22) Filed: Sep. 24, 2013

(65) Prior Publication Data

US 2014/0025815 A1    Jan. 23, 2014

Related U.S. Application Data

(63) Continuation of application No. 10/205,593, filed on Jul. 23, 2002, now Pat. No. 8,560,666.

(60) Provisional application No. 60/307,828, filed on Jul. 25, 2001.

(30) Foreign Application Priority Data

Jul. 23, 2001   (AU) .................................. 6535/01

(51) Int. Cl.
G06F 15/173    (2006.01)
H04L 12/26     (2006.01)
(Continued)

(52) U.S. Cl.
CPC .......... *H04L 43/045* (2013.01); *G06F 17/3089* (2013.01); *H04L 29/06* (2013.01); *H04L 67/22* (2013.01); *H04L 67/306* (2013.01); *H04L 69/329* (2013.01)

(58) Field of Classification Search
CPC .................................................... G06F 17/3089
See application file for complete search history.

(56) References Cited

U.S. PATENT DOCUMENTS 5,560,008 A   9/1996  Johnson et al.
5,696,898 A   12/1997 Baker et al.
(Continued)

FOREIGN PATENT DOCUMENTS

JP    11-068828      3/1999
WO    WO 96/42041    12/1996
(Continued)

OTHER PUBLICATIONS

Yoon, Chang Woo; "Vicarious Certification and Billing Agent for Web Information Service", High Spped Network Access Section, Electronics and Telecommunications Research Institute, Jan. 21-23, 1998, pp. 344-349.
(Continued)

*Primary Examiner* — Yves Dalencourt

(57) ABSTRACT

A method, performed by a computer system, of providing usage data for a plurality of hyperlinks in a resource is disclosed. In one aspect, the method includes maintaining hyperlink usage data for each of the hyperlinks within the resource and adjusting a copy of the resource to incorporate the hyperlink usage data associated with each hyperlink, wherein the hyperlink usage data represents the number of times users have selected a hyperlink of the resource. The method also includes sending the adjusted copy of the resource to a networked device to provide a display representing the hyperlink usage data with each associated hyperlink. The hyperlink usage data is incorporated into the copy of the resource so as to be displayed adjacent to the corresponding hyperlinks of the resource.

19 Claims, 6 Drawing Sheets

(51) Int. Cl.
  *G06F 17/30* (2006.01)
  *H04L 29/06* (2006.01)
  *H04L 29/08* (2006.01)

(56) References Cited

U.S. PATENT DOCUMENTS

| | | |
|---|---|---|
| 5,717,923 A | 2/1998 | Dedrick |
| 5,745,694 A | 4/1998 | Egawa et al. |
| 5,819,092 A | 10/1998 | Ferguson et al. |
| 5,889,958 A | 3/1999 | Willens |
| 5,948,061 A | 9/1999 | Merriman et al. |
| 6,209,033 B1 | 3/2001 | Datta et al. |
| 6,308,210 B1 | 10/2001 | Fields et al. |
| 6,549,944 B1 | 4/2003 | Weinberg et al. |
| 7,249,048 B1 | 7/2007 | O'Flaherty |
| 7,296,734 B2 | 11/2007 | Pliha |
| 7,499,868 B2 | 3/2009 | Galperin et al. |
| 7,707,059 B2 | 4/2010 | Reed et al. |
| 7,925,549 B2 | 4/2011 | Looney et al. |
| 7,996,521 B2 | 8/2011 | Chamberlain et al. |
| 8,015,045 B2 | 9/2011 | Galperin et al. |
| 8,145,754 B2 | 3/2012 | Chamberlain et al. |
| 8,285,577 B1 | 10/2012 | Galperin et al. |
| 8,533,322 B2 | 9/2013 | Chamberlain et al. |
| 8,560,666 B2 * | 10/2013 | Low .............................. 709/224 |
| 8,606,626 B1 | 12/2013 | DeSoto et al. |
| 2002/0069203 A1 | 6/2002 | Dar et al. |
| 2002/0138333 A1 | 9/2002 | DeCotiis et al. |
| 2002/0138334 A1 | 9/2002 | DeCotiis et al. |
| 2002/0161664 A1 | 10/2002 | Shaya et al. |
| 2004/0024848 A1 | 2/2004 | Smith et al. |
| 2004/0153509 A1 | 8/2004 | Alcorn et al. |
| 2005/0021397 A1 | 1/2005 | Cui et al. |
| 2007/0156515 A1 | 7/2007 | Hasselback et al. |
| 2008/0120155 A1 | 5/2008 | Pliha |
| 2009/0228918 A1 | 9/2009 | Rolff et al. |
| 2011/0307397 A1 | 12/2011 | Benmbarek |
| 2013/0132151 A1 | 5/2013 | Stibel et al. |

FOREIGN PATENT DOCUMENTS

| | | |
|---|---|---|
| WO | WO 98/41913 | 9/1998 |
| WO | WO 98/57285 | 12/1998 |
| WO | WO 99/32985 | 7/1999 |
| WO | WO 99/37066 | 7/1999 |
| WO | WO 99/59375 | 11/1999 |
| WO | WO 99/67731 | 12/1999 |
| WO | WO 00/68862 | 11/2000 |
| WO | WO 02/13025 | 2/2002 |

OTHER PUBLICATIONS

Zen et al., "Value-Added Internet: a Pragmatic TINA-Based Path to the Internet and PSTN Integration", Global Convergence of Telecommunications and Distribute Object Computing, Nov. 17-20, 1997, pp. 10.

International Search Report and Written Opinion for Application No. PCT/US10/34434, dated Jun. 23, 2010.

* cited by examiner

Figure 3

LINK USAGE

RELATED APPLICATIONS

This application is a continuation application which claims priority under 35 U.S.C. §120 from application Ser. No. 10/205,593 filed Jul. 23, 2002, which is hereby incorporated by reference. Application Ser. No. 10/205,593 claimed the benefit of U.S. provisional patent application 60/307,828 filed on Jul. 25, 2001 and Australian patent application PR 6535/01 filed on Jul. 23, 2001, both of which are hereby incorporated by reference.

FIELD

The described technology generally relates to link usage, and in particular to a system and method for determining and displaying the usage of links.

BACKGROUND

A web page typically contains references, or hyperlinks, to other parts of the page, other web pages and/or other resources. In particular, portal sites, which are web sites that constitute a convenient starting point for users of the Internet, provide web pages which include large numbers of links to other web pages and/or sites. Typically, some of these links are links to resources associated with sponsors of the portal site, and the operators of the site may generate revenue when users select those links. It is important for a web page designer to have some indication of the usage of those links, that is, the number of referrals or 'clickthroughs' generated by links on the web page. This information is not only important for determining the revenue generated from sponsored links, but is also important for web page design, as the link usage indicates the effectiveness of various kinds of links and the overall design of the web page.

Currently, link usage is measured by analyzing web server log files, with the result that a count of the number of clickthroughs may be determined for each link over the time period since the previous log file analysis was performed. Thus, for example, a portal site may provide a web designer with a usage count for a given link, and this may be used to determine the revenue owed to the portal site provider from the advertiser associated with the link. However, this method provides a limited amount of information to the site provider and/or web designer. It is desired, therefore, to provide an improved method and system for measuring and displaying link usage, or at least a useful alternative to existing methods and systems.

SUMMARY

One inventive aspect is a method for providing usage data for links in a resource, comprising maintaining link usage data for each of the links within the resource, and adjusting a copy of the resource to incorporate the link usage data associated with each link.

Another aspect is a method of monitoring link usage, comprising accepting a request to monitor usage of links of a resource, accessing the resource and storing a copy of the resource, adjusting the links of the resource to refer to a link usage server, maintaining link usage data for the links of the resource using the link usage server, and providing, in response to a request, the copy of the resource with the link usage data collected for a period time, the link usage data being incorporated into the copy of the resource so as to be displayed adjacent the corresponding links of the resource.

Another aspect is a method of obtaining link usage data is provided, comprising submitting a resource identifier to a link usage process, requesting link usage data, receiving the link usage data with a resource associated with the identifier, and displaying the resource adjusted to display the link usage data adjacent the links of the resource.

Another aspect is a system having components for executing any of the above methods.

Another aspect is software having code for executing any of the above methods.

Another aspect is a link usage interface, comprising means for accessing a resource with link usage data, and means for generating a display of a resource with link usage data adjacent the links of the resource.

Another aspect is a link data system, comprising means for maintaining link usage data for each of said links within the resource and means for adjusting a copy of the resource to incorporate the link usage data associated with each link.

Another aspect is a link data system, comprising means for maintaining link usage data for each of said links within the resource, means for adjusting a copy of the resource to incorporate the link usage data associated with each link, and means for accessing a server accessible on the Internet.

Another aspect is a computer-readable medium containing code for controlling a computer to perform a method of providing usage data for links in a resource, the method comprising maintaining link usage data for each of said links within the resource and adjusting a copy of the resource to incorporate the link usage data associated with each link.

BRIEF DESCRIPTION OF THE DRAWINGS

Embodiments are hereinafter described, by way of example only, with reference to the accompanying figures.

FIG. 3 is a screen dump of a web browser application displaying a web page.

DETAILED DESCRIPTION

Embodiments will now be described with reference to the accompanying drawings, wherein like numerals refer to like elements throughout. The terminology used in the description presented herein is not intended to be interpreted in any limited or restrictive manner, simply because it is being utilized in conjunction with a detailed description of certain specific embodiments. Furthermore, embodiments may include several novel features, no single one of which is solely responsible for its desirable attributes or which is essential to practicing embodiments herein described.

Figure 1:
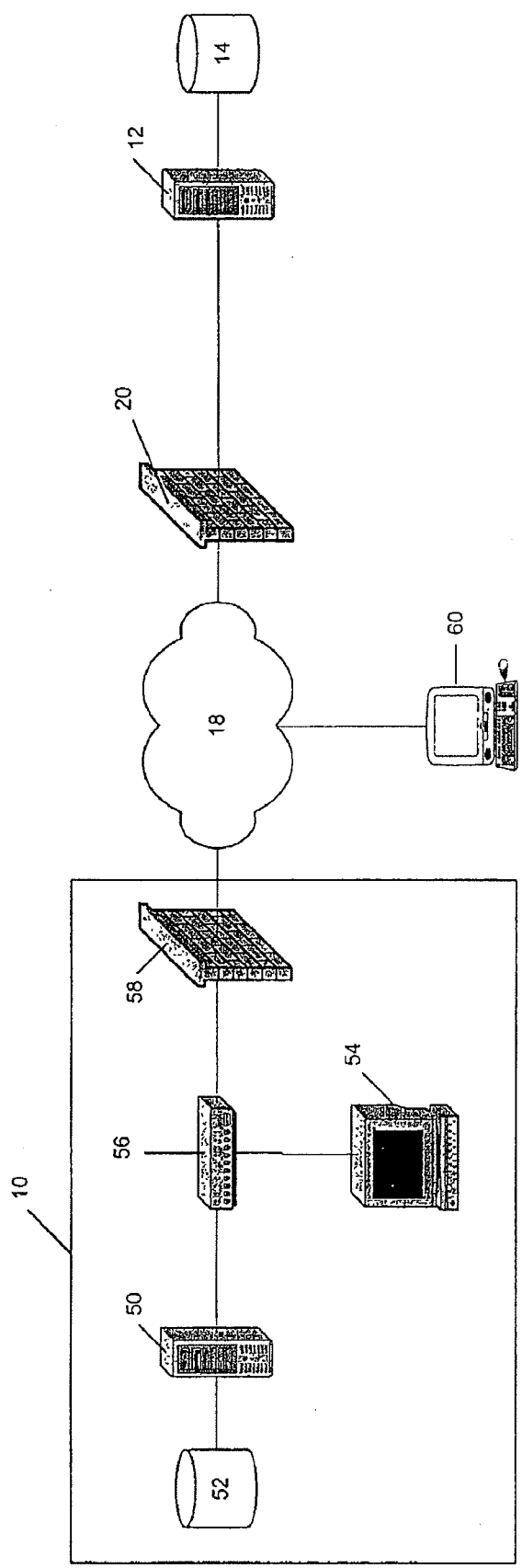
FIG. 1 is a schematic diagram of an embodiment of a link usage system connected to a web site through a communications network.
Figure 2:
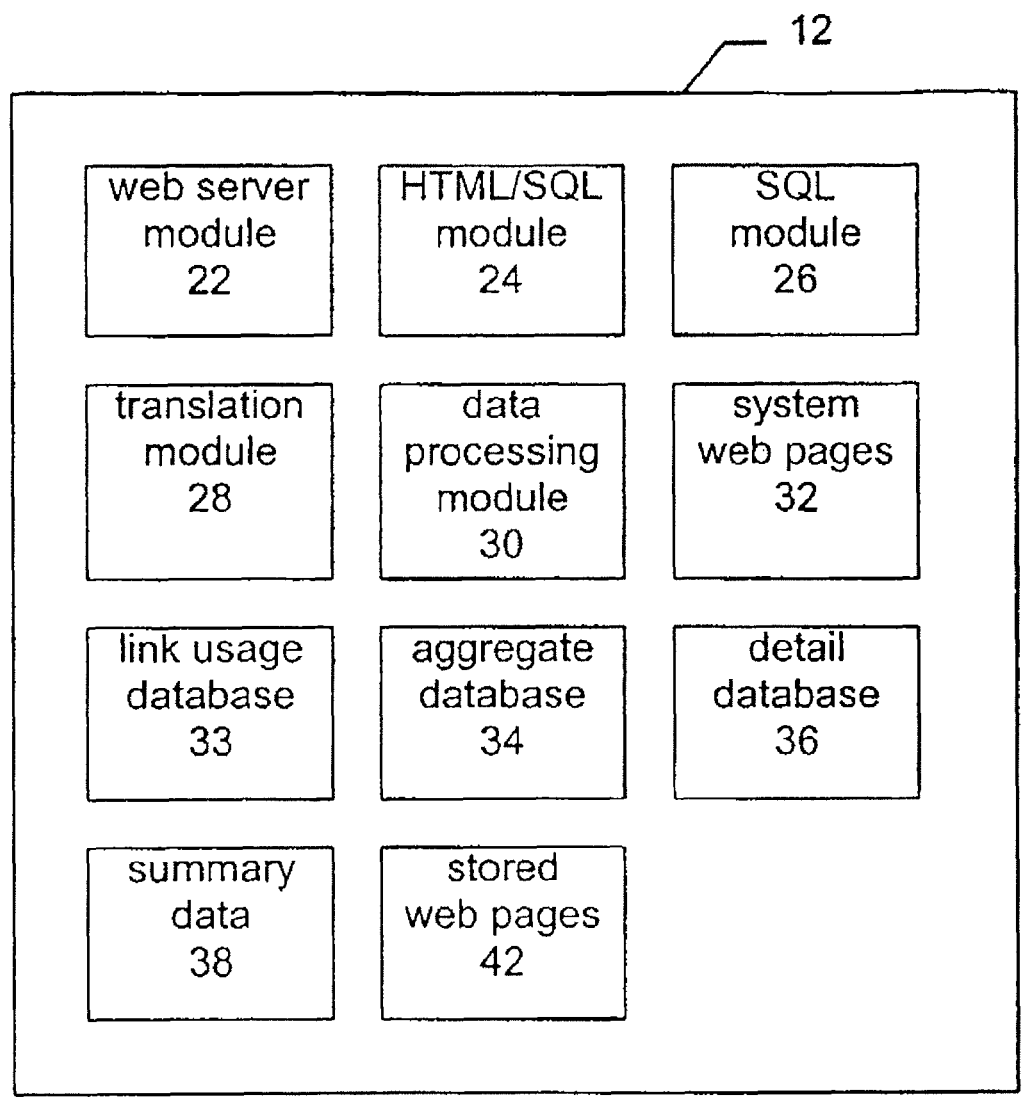
FIG. 2 is a block diagram of the software modules of the system.

As shown in FIG. 1, a link usage system includes a server 12 with associated disk storage 14. The server 12 may be connected to a communications network 18, such as the Internet, through a firewall 20. The server 12 may be a standard computer system, such as an Intel®-based computer system running a Unix® operating system. The disk storage 14 may be a standard hard disk storage of the server 12, and may be used to store a number of software code modules 22 to 32, and standard databases 33, 34, 36, such as Oracle® databases, as shown in FIG. 2. The web server module 22 may be a standard web server software module, such as Apache, available from www.apache.org, and allows the server 12 to act as a web server. The SQL module 26 may be a standard structured query language (SQL) interface and provides a means of interacting with the databases 34, 36. The HTML/SQL module 24 may be an embedded scripting language support module that provides an interface between HTML and SQL, and may be a Microsoft® Active Server Pages (ASP) server module, or embedded Perl. The module 24 allows the web server module 22 to generate HTML code in response to SQL queries performed on the databases 34, 36. The translation module 28 translates links in web pages to a modified form having links to enable link usage information to be stored in a link usage database 33 on the disk storage 14. The data processing module 30 provides processes for aggregating the link usage database 33 and producing the databases 34,36 and summary data 38 from link usage data.

The link usage system is connected via the communications network 18 to a system 10 for maintaining a web site, comprising a web server 50 and associated disk storage 52, and a web page developer workstation 54, which are connected by a standard network hub 56 and are connected to the communications network 18 through a firewall 58. The web site system 10 may be operated or hosted by an Internet service provider (ISP). The link usage system executes a link usage process that monitors link usage or click through events associated with a web page of the web site, and displays link usage information on demand. In the described implementation, the link usage process is implemented by software modules of the server 12. However, it will be apparent to the skilled technologist that the process may be executed by a variety of systems over a variety of locations connected by the network 18, and may be executed, at least in part, by dedicated hardware circuits such as application-specific integrated circuits (ASICs).

Figure 3:
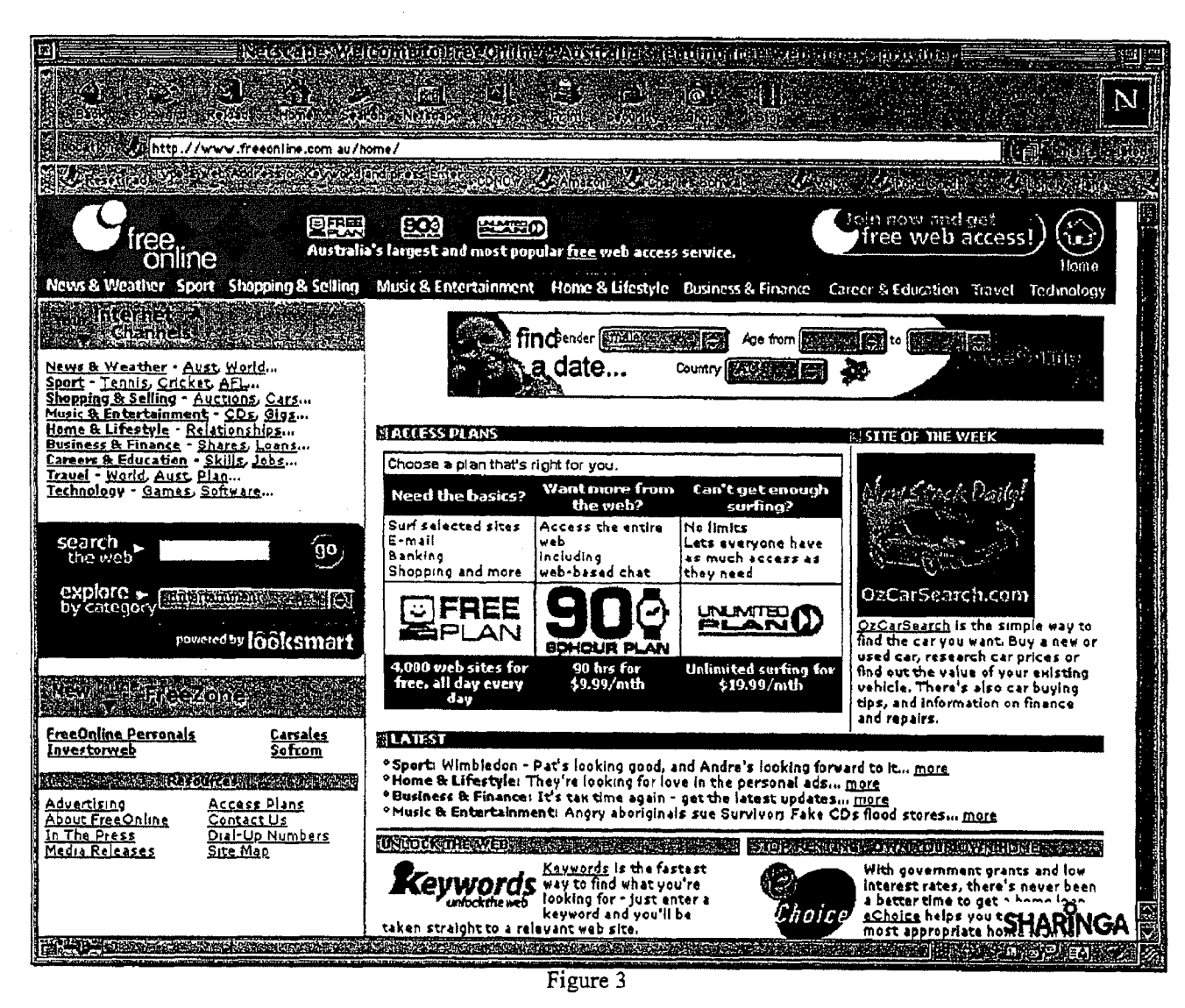

The web site system 10 can be used to host a number of web sites, including a portal site for users of the Internet 18. A portal page of the site generally provides a convenient starting point for users of the Internet 18, and provides a large number of links to various services and advertisers. The portal page, as shown in FIG. 3, is developed and maintained by a web page developer using the workstation 54 of the web site system 10. Typically, such a page is updated or otherwise modified on a regular basis, typically at least one per day, but perhaps even several times per day.

Having link usage data for the page would assist the development process considerably. For the purposes of simplicity, use of the link usage system is described below for this portal page, but the system can be used with any resource having links that is accessible on the network 18. When the developer produces a new or modified web page for the web site 10, the developer is able to log into the server 12 of the link usage system using a web browser application to enter a username/password pair (step 100). After logging on to the link usage system, the developer uploads the new web page to the server 12 by selecting the file and clicking on a 'submit' button in a link usage page displayed by the web browser (step 102). The page is received by the server 12 and stored as a web page snapshot 42 on the disk storage 14 associated with the server 12 (step 104). However, the web page is also translated by the translation module 28 of the server 12 (step 106). The translation modifies links in the web page so that they refer to the server 12 of the link usage system, rather than the original link reference. For example, an original link of the web page might refer to: http://www.freeonline.com.au/main.shtml where www.freeonline.com.au is the domain name of the portal site.

The translation module 28 modifies this link to be:
http://www.refer.com/freeonline.com.au/main/XX_NB 04_XX_MM_XXXX_IM?ref=http://wvvw.freeonline.com.au/main.shtml where www.refer.com is the domain name of the server 12 of the link usage system. The modified link includes an encoded key, in this example XX_NB_04_XX_MM_XXXX_IM, which represents information about a particular link, including link classification information; for example, whether the link is associated with an image, and whether the link is associated with an affiliate of the web site. The key also includes index information for indicating the link's position in the page source. For example, the index information for the above link is given by the third component of the key, "04", which indicates that the link is the fourth sequential link of the web page source. This indexing is used because a single web page may contain multiple links to the same URL.

The translated web page may be then published directly from the server 12 to the web server 50 of the web site system 10 (step 108). Alternatively, it may be saved on the workstation 54 by the developer, or published to the server 12 of the link usage system for public access, depending upon the desires of the web page developer and the policies of the provider of the web site. Once published, the modified web page may be accessed by users of the Internet 18.

A user of a networked computer 60 may access the modified web page by directing a web browser application executing on the computer 60 to the web server 50 via the Internet 18. When the user selects one of the modified links, such as the modified link shown above, a request is generated to the server 12 of the link usage system (step 200). When the server 12 receives the request, it creates a record (step 202) in the link usage database 33, recording the link details, http headers, and the time of the request. If the user is known to the link usage system, an identifier of the user is also stored in the database record. For example, if the web site system 10 is operated by an ISP, and the user is connected to the Internet 18 through an access system of the ISP, the ISP may associate an identifier with the user's request by generating a cookie for the user, or by maintaining an identifier with requests issued by the user's web browser, such as discussed in International Patent Application No. PCT/AU00/00418 and Australian Patent Application PQ9240/00, which are hereby incorporated by reference.

After logging the link usage information in the link usage database 33 record, the server 12 then performs an HTTP redirect (step 204) to redirect the user's web browser to the resource indicated by argument to the link. Thus, as far as the user of the computer 60 is concerned, selection of the modified link results in a request to the resource corresponding to the original link, in this case, http://www.freeonline.com.au/main.shtml.

At regular and configurable intervals, the server 12 of the link usage system invokes the data processing module 30 to perform temporal aggregation of the link usage database 33 (step 206). For example, the server 12 may be configured to perform this step at intervals of 15 minutes, 30 minutes, 1 hour, 2 hours, 6 hours, 12 hours or 24 hours. The temporal aggregation aggregates entries for each user, identified or anonymous, over time to produce a single entry for each link selected by a unique user in an aggregate database 34. Each entry of the aggregate database 34 includes the local universal resource locator (URL) on the referral system corresponding to the link, information contained in the http header such as the foreign URL corresponding to the original link, the entry date, the number of times the link was selected by a particular user, and the unique identifier of that user. For example, the aggregate database 34 might include an entry of the form: www.refer.com/freeonline.com.au/main/ XX_NB_04_XX_MM_XXXX_1M, www.freeonline.com.au/main.shtml. 2001-07-01, 2, 781598 where the user with identifier 781598 has selected the particular link twice since the log file 33 was last processed. After entries in the log file 33 are processed, they are deleted.

For each entry in the aggregate database 34, the data processing module 30 also produces an expanded entry in a detail database 36. The detail database 36 contains the same information as the aggregate database 34, but the encoded classification information for the link is expanded so that each component of the encoded information may be given its own entry. For example, the encoded string XX_NB_04XX_MM_XXXX_IM is expanded into its components XX, NB, 04, XX, MM, XXXX, and IM. This allows queries to be made against the detail database 36 for one or more of the components of the classification information. For example, a query could be performed for data corresponding to the third item of a particular pane of the web page, and/or any other particular classification of the link represented by the classification data.

At any time, the web page developer using the workstation 54 of the web site may access the web server module 22 executing on the server 12 of the link usage system to view usage data of a web page. For example, using a secure HTTPS connection, the web page developer logs into the server 12 as described above (step 300), and selects a link usage information web page of the system web pages 32. This page allows the web page developer to select a particular web page from a list, and to request summary data over a selectable period of time after the page has been submitted for link usage monitoring (step 302). For example, the web page developer may request link usage information on the portal web page of FIG. 3, accumulated over the past 24 hours. In response, the server 12 executes a summary process (step 304) of the data processing module 30. The summary process aggregates usage information for each link to produce summary data 38 for the selected web page for the start and end times specified. The summary data 38 includes the encoded classification data string for each link of the page, together with the total number of link usage or clickthroughs recorded for that link, and the total number of unique users that have selected the link in the time period selected. The data processing module 30 then retrieves the stored version 42 of the portal web page, and produces (step 306) a modified version in which the usage of each link of the page is embedded within the page, using the index information of the encoded information for each link to determine the link with which to associate each usage count. The web page author may select whether the number displayed is the total usage, or the total number of unique users using the link.

Figure 4:
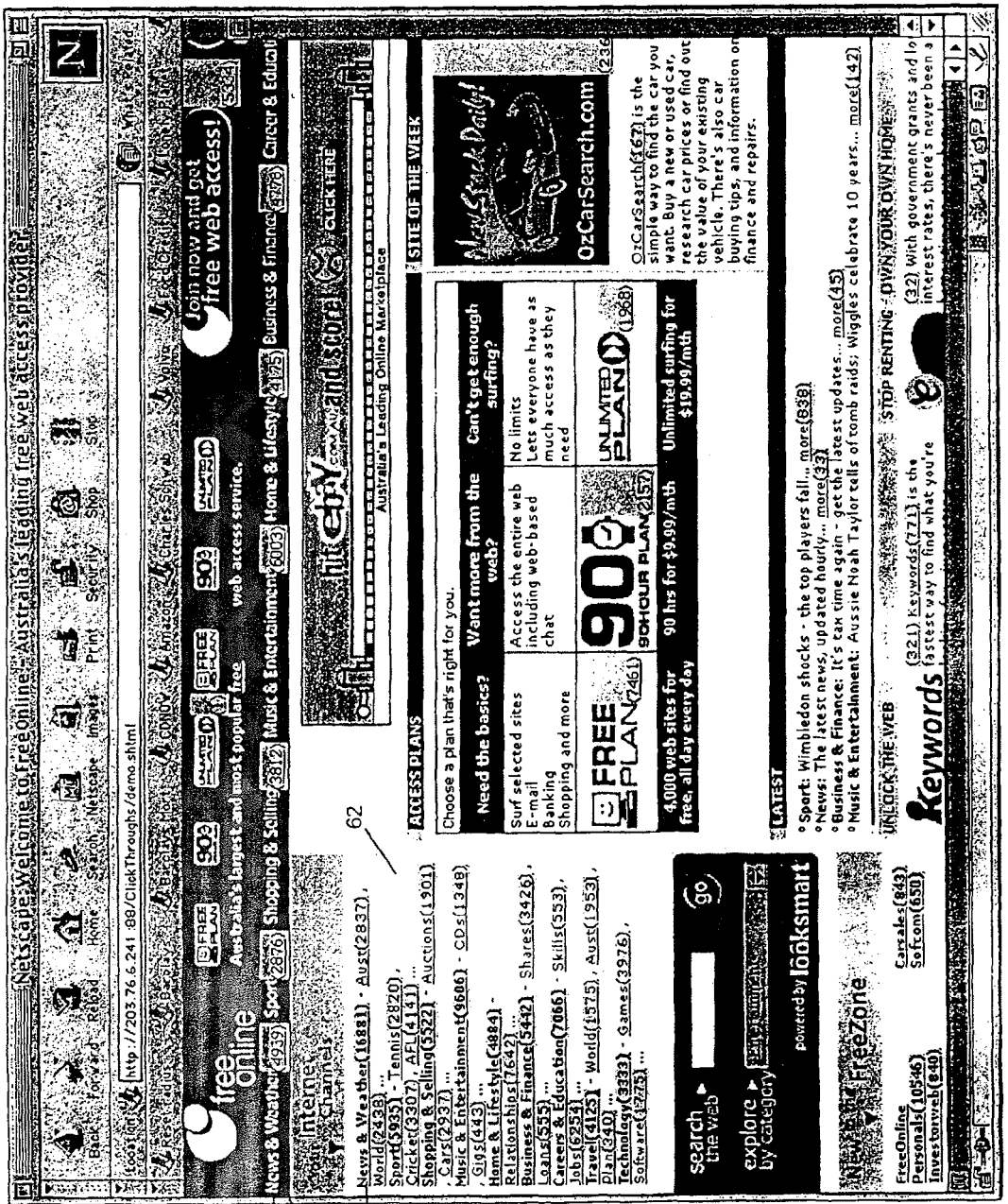
FIG. 4 is a screen dump of a web browser application displaying an embodiment of a web page link usage page generated by the system.
Figure 5:
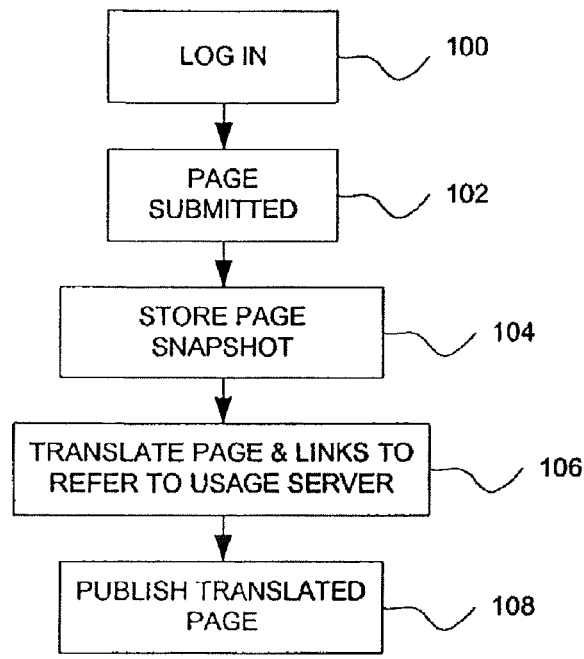
FIG. 5 is a flowchart of the link usage system software, according to one embodiment.
Figure 6:
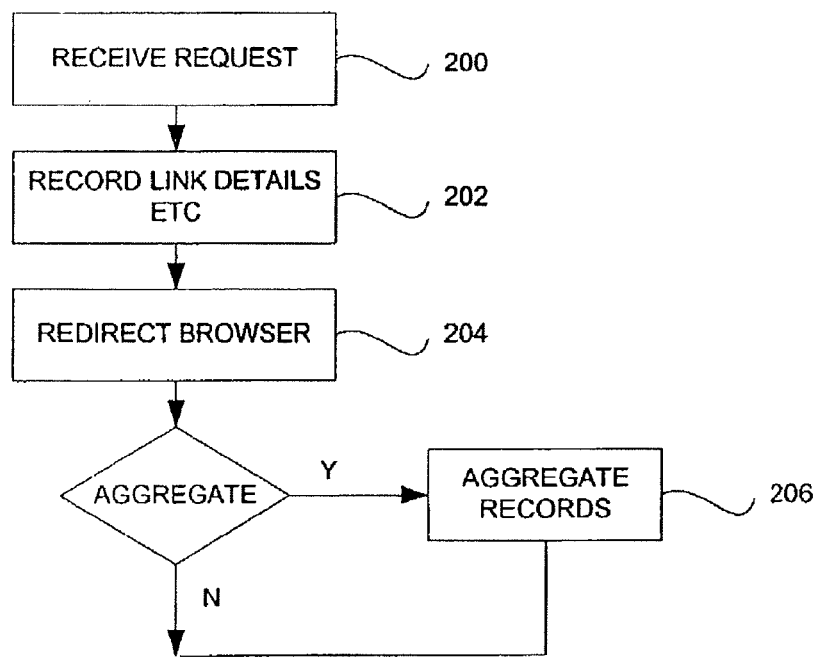
FIG. 6 is a flowchart of the link usage system software, according to another embodiment.
Figure 7:
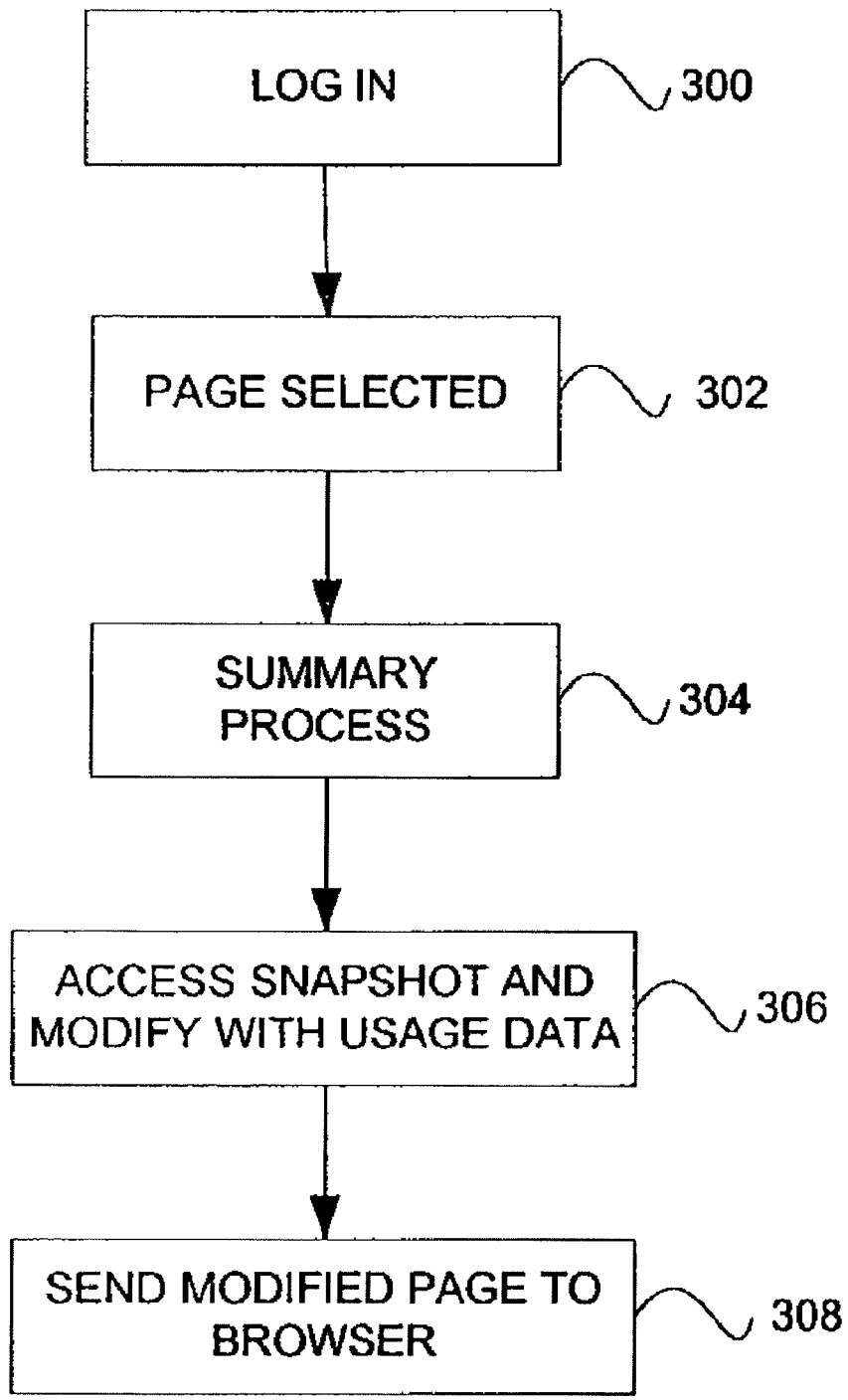
FIG. 7 is a flowchart of the link usage system software, according to yet another embodiment.

As shown in FIG. 4, an interface is provided back to the developer's browser (step 308) that embeds the requested usage data within the page in such a way that the appearance of the original web page is approximately maintained, but the usage of each link is displayed in parentheses together with and adjacent the link. The usage information is formatted in such a way as to distinguish it from the other information on the page; for example, by bright yellow highlighting and the use of a bold, distinctive typeface. This provides an immediate visual indication of the number of times that each link on the page has been selected. Because the usage information is stored together with the link, the usage data is intuitively associated with the corresponding link by a viewer of the displayed page.

By presenting link usage data embedded within the web page itself, web page developers, advertisers, and others may rapidly determine the effectiveness of the links in the page for attracting users. This includes determining the effect of the nature and position of the link within the page, and whether the inclusion of graphics attracts users to a particular link. For example, FIG. 4 shows that the "News & Weather" link 44 in the bar 46 running across the page attracted 4939 clicks, whereas the link 48 referencing the identical resource and with an identical label in the left-hand panel 62 has attracted 16881 clicks over the same usage period, suggesting that most users ignore the bar 46 and will use the panel 62 instead. It is also important that the link usage system uses a stored version 42 of the original web page corresponding to the dates of the usage data, because the web page may be modified one or more times per day, and the usage information may not be relevant to a different version of the page. Consequently, the system maintains a stored version of each web page, and checks that the dates for which usage information is requested correspond to a single stored version of the page. However, the user is able to override this check is desired. This is useful for monitoring unchanged links in a page.

In an alternative embodiment, the summary data 38 is generated on the basis of user profile data associated with the user identifier stored in the link usage database 33, the aggregate database 34, and the detail database 36. Thus, for example, a link usage display of the form shown in FIG. 4 is displayed for males between the ages of 31 and 40 with an income exceeding $50,000 per annum. Also, usage data for different demographics of users may be displayed together, next to the link, so as to provide a visual comparison. The profile data can be maintained using systems as described in International Patent Application PCT/AU00/00418 and Australian Patent Application PQ9240/00, which are hereby incorporated by reference.

The foregoing description details certain embodiments. It will be appreciated, however, that no matter how detailed the foregoing appears in text, the described technology can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method, performed by a computer system, of providing usage data for a plurality of hyperlinks in a resource, comprising:
   maintaining hyperlink usage data for each of the hyperlinks within the resource;
   adjusting a copy of the resource to incorporate the hyperlink usage data associated with each hyperlink, wherein the hyperlink usage data represents the number of times users have selected a hyperlink of the resource; and
   sending the adjusted copy of the resource to a networked device to provide a display representing the hyperlink usage data with each associated hyperlink, wherein the hyperlink usage data is incorporated into the copy of the resource so as to be displayed adjacent to the corresponding hyperlinks of the resource.

2. The method as claimed in claim 1, further comprising storing the copy of the resource.

3. The method as claimed in claim 1, further comprising modifying the hyperlinks of the resource to refer to a hyperlink data system for generating and maintaining the hyperlink usage data.

4. The method as claimed in claim 3, wherein the adjusting includes generating classification data for each hyperlink.

5. The method as claimed in claim 4, wherein the classification data includes data for identifying the corresponding hyperlink.

6. The method as claimed in claim 5, wherein the classification data includes data for classifying the resource referred to by the corresponding hyperlink.

7. The method as claimed in claim 3, wherein the hyperlink usage data includes user identifier data.

8. The method as claimed in claim 7, wherein the generating includes additionally comprising generating hyperlink usage data for each hyperlink on the basis of user profile data associated with the user identifier data.

9. The method as claimed in claim 1, wherein the resource is a web page accessible on the Internet, and the hyperlinks are HTTP links.

10. A method, performed by a computer system, of obtaining hyperlink usage data, comprising:
    submitting a resource identifier to a hyperlink usage process;
    requesting hyperlink usage data;
    receiving the hyperlink usage data with a resource associated with the identifier;
    incorporating the hyperlink usage data into a copy of the resource; and
    displaying the incorporated hyperlink usage data adjacent to corresponding hyperlinks of the resource, wherein the hyperlink usage data represents the number of times users have selected a hyperlink of the resource.

11. The method as claimed in claim 10, wherein the resource is a web page accessible on the Internet, and the hyperlinks are HTTP links.

12. A non-transitory computer-readable medium containing code for controlling a computer to perform a method of providing usage data for hyperlinks in a resource, the method comprising:
    maintaining hyperlink usage data for each of the hyperlinks within the resource;
    adjusting a copy of the resource to incorporate the hyperlink usage data associated with each hyperlink, wherein the hyperlink usage data represents the number of times users have selected a hyperlink of the resource; and
    sending the adjusted copy of the resource to a networked device to provide a display representing the hyperlink usage data with each associated hyperlink,
    wherein the hyperlink usage data is incorporated into the copy of the resource so as to be displayed adjacent to the corresponding hyperlinks of the resource.

13. The non-transitory computer-readable medium as claimed in claim 12, wherein the resource is a web page accessible on the Internet, and the hyperlinks are HTTP links.

14. A method, performed by a computer system, of providing usage data for hyperlinks in a resource, comprising:
    obtaining hyperlink usage data for each of the hyperlinks within the resource, the hyperlink usage data representing usage of the hyperlinks by users of the resource; and
    generating display data, using the usage data, for displaying a visual representation of the resource,
    wherein the hyperlink usage data is incorporated into a copy of the resource so as to be displayed adjacent to the corresponding hyperlinks of the resource.

15. The method as claimed in claim 14, wherein a browser of a client device is configured to produce said representation on the client device using the display data.

16. The method as claimed in claim 14, wherein the resource is a web page accessible on the Internet, and the hyperlinks are HTTP links.

17. A method, performed by a computer system, of providing usage data for hyperlinks in a resource, comprising:
    obtaining hyperlink usage data for each of the hyperlinks within the resource, the hyperlink usage data representing the number of times users of the resource have selected a hyperlink of the resource; and
    providing display data for generating a representation of the resource showing the hyperlink usage data with each associated hyperlink,
    wherein the hyperlink usage data is incorporated into a copy of the resource so as to be displayed adjacent to the corresponding hyperlinks of the resource.

18. The method as claimed in claim 17, wherein a browser of a client device is configured to produce said representation on the client device using the display data.

19. The method as claimed in claim 17, wherein the resource is a web page accessible on the Internet, and the hyperlinks are HTTP links.

* * * * *